United States Patent [19]

Takahashi et al.

[11] Patent Number: 4,647,168
[45] Date of Patent: Mar. 3, 1987

[54] PHOTOGRAPHIC APPARATUS ACCOMMODATING A PLURALITY OF FILM PACKS

[75] Inventors: Tomoyuki Takahashi; Masashi Katoh; Hisashi Kikuchi, all of Kanagawa, Japan

[73] Assignee: Fuji Photo Film Co., Ltd., Kanagawa, Japan

[21] Appl. No.: 753,328

[22] Filed: Jul. 9, 1985

[30] Foreign Application Priority Data

Jul. 9, 1984 [JP] Japan ............................... 59-142017

[51] Int. Cl.⁴ ............................................. G03B 17/52
[52] U.S. Cl. ........................................ 354/86; 354/174
[58] Field of Search ....................... 354/83, 84, 85, 86, 354/174, 178, 179, 304

[56] References Cited

U.S. PATENT DOCUMENTS

| | | | |
|---|---|---|---|
| 3,744,390 | 7/1973 | Clark | 354/174 |
| 3,820,136 | 6/1974 | Kennedy | 354/174 |
| 3,899,337 | 8/1975 | Nestor | 354/86 |
| 4,089,017 | 5/1978 | Buldini | 354/174 |

Primary Examiner—A. A. Mathews
Attorney, Agent, or Firm—Young & Thompson

[57] ABSTRACT

A photographic apparatus for use with the peel-apart type self-developing film units contained in a cassette is provided for allowing a user to take a photograph of himself and obtain the print then and there. The apparatus includes a camera back which is moved forward for urging the cassette in order to locate photosensitive sheets of film units in the cassette in position for exposure and retracted from the cassette after, say, ten exposures. The camera back is kept retracted for a time sufficient to allow automatic supplying of a fresh film pack which is the foremost one of a plurality of film packs contained in a rack. The apparatus also includes a film unit withdrawing apparatus for automatically withdrawing an exposed film unit for providing the print to the user.

14 Claims, 11 Drawing Figures

PHOTOGRAPHIC APPARATUS ACCOMMODATING A PLURALITY OF FILM PACKS

BACKGROUND OF THE INVENTION

The present invention relates to a photographic apparatus for use with a peel-apart type self-developing film unit and more particularly to an improved photographic apparatus suitable for a stationary installed photographic apparatus.

In general, photographic apparatus for allowing a user to take a photograph of himself with ease and to obtain it then and there is well known in the form of photo booths. Such photographic apparatus is widely used because it is easy to use and convenient. This apparatus automatically performs several process, including taking a photograph of the user, developing the exposed film unit, and providing a print, when coins are inserted thereinto.

In the photographic apparatus heretofore used, it is essential to service the processing liquids, as by checking the composition of the liquids, replenishing the liquids and the like. Because it is unnecessary for processing liquid to be provided in the apparatus, instant photographic apparatus for use with self-developing film units are advantageously used.

In this latter case, as is well known, an operation is required for the self-developing film unit to distribute and spread a processing liquid between the superposed photosensitive and image receiving sheets by means of pressure applying members. When leaving this operation to a user, not only does the user begrudge doing it, but also prints of uniform quality are seldom produced. Furthermore, since a film pack now on the market generally comprises a cassette and eight film units contained in the cassette, the instant photographing apparatus requires a fresh film pack every eight exposures, which results in an inefficient use of the apparatus.

OBJECTS OF THE INVENTION

It is therefore a first object of the present invention to provide a photographic apparatus for use with a film pack having a plurality of peel-apart type self-developing film units, in which a series of processes from taking a photograph to providing a print automatically takes place.

It is another object of the present invention to provide a photographic apparatus for use with a film pack having a plurality of peel-apart type self-developing film units in which a fresh film pack is automatically supplied and located in position for exposure.

It is still another object of the present invention to provide a photographic apparatus in which exposed film units are automatically withdrawn so as to provide prints of uniform quanlity.

For accomplishing the above-mentioned objects, in accordance with one embodiment of the present invention, there are provided means for transferring a fresh film pack in a rack and locating it in an exposure position, means for urging a cassette of the film pack so as to position self-developing film units for exposure, and means for withdrawing the self-developing film unit after exposure. The urging means is adapted to be drawn away from the cassette every eight exposures and kept there for a certain time during which the transferring means is caused to push the fresh film pack.

BRIEF DESCRIPTION OF THE INVENTION

These and other objects and advantages of the present invention will appear in the following description which will be more clearly understood when read with reference to the accompanying drawings, in which.

DESCRIPTION OF THE PREFERRED EMBODIMENT

Figure 1:
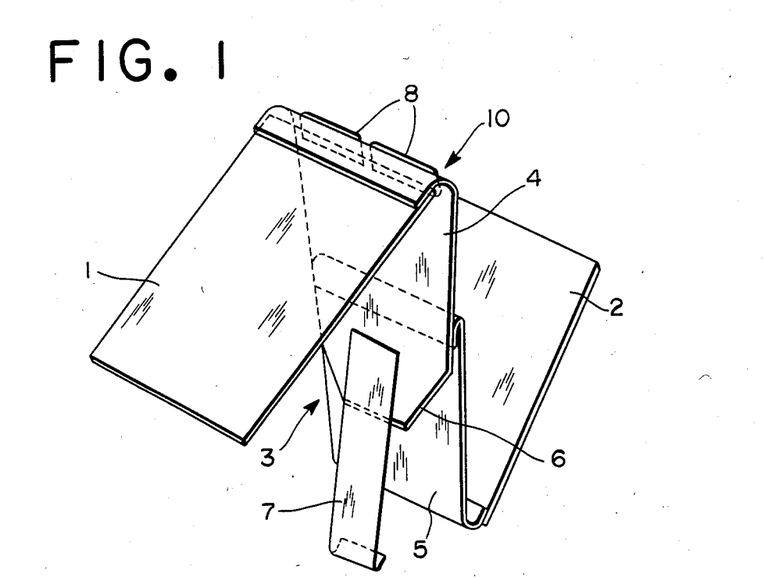
FIG. 1 is a schematic view of a peel-apart type self-developing film unit.

Referring now to FIG. 1, shown therein is a self-developing film unit 10 (which is referred to as a film unit hereinafter) of the peel-apart type which comprises photosensitive and image-receiving sheets 1, 2 mounted on a carrier sheet 3 which has first and second sections 4, 5. The carrier sheet 3 is adapted to function as a leader for connecting the photosensitive and image-receiving sheets 1, 2, properly registering the sheets 1, 2 relative to each other when the sheets 1, 2 are superposed. The first section 4 has a trailing end to which the photosensitive sheet 1 is connected and on which two rupturable containers or pods 8 releasably holding a processing liquid are mounted. The second section 5 is connected to the middle of the first section 4 at its leading end and to the leading end of the image-receiving sheet 2 at its trailing end. A tab 7 which is attached to a tapered portion 6 of the first section 4 has an end connected to, but easily separable from, a tab of the immediately preceding film unit (not shown).

Figure 2:
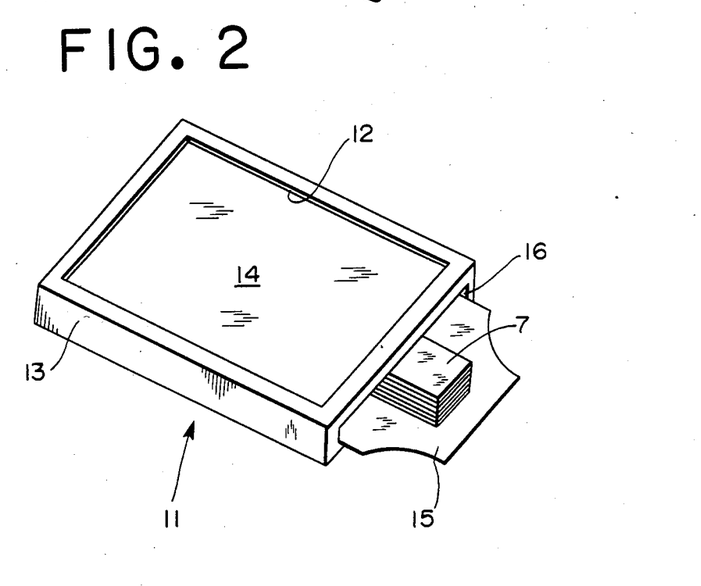
FIG. 2 is a perspective view of a film pack.

An assembly of film units 10 in the form of a film pack 11 is illustrated in FIG. 2. The film pack 11 comprises a plurality, usually eight, of film units 10 contained in stacked relation in a cassette 13 which has a generally rectangular forward wall provided with an exposure aperture 12 through which photosensitive sheets are adapted to be exposed and an end wall forming an elongated slot 16 through which film units may be withdrawn. The film pack 11 is initially provided with a protective dark sheet 14 for preventing ambient light from falling on the film units 10 through the exposure apparatus 12.

A film pack of this type is disclosed, for example, in U.S. Pat. No. 3,899,337 issued Aug. 12, 1975.

The film pack 11 may be loaded into a camera back having a pair of liquid-spreading rolls in such a way that protective dark sheet 14 at its leading end 15 is located between the liquid-spreading rolls. The protective dark sheet 14 is then withdrawn from the camera back by pulling the leading end 15 thereof so as to allow a foremost film unit 10 in the cassette to be exposed through the aperture 12. At this time, the tab 7 having one end attached to the foremost film unit 10 projects through the slot 16 of the camera back exterior thereof. After the exposure of the photosensitive sheet of the foremost film unit 10, the tab 7 is pulled so that the tapered portion 6 projects through a nip formed between the liquid-spreading rolls outside the camera, while the tab 7 is peeled apart from the film unit 10, more specifically from the first section 4 of the carrier sheet 3. Then the tapered portion 6 of the first section 4 of the carrier sheet 3 thus projected outside the camera is continuously withdrawn so as to advance the photosensitive and image-receiving sheets 1 and 2 between the liquid-spreading rolls in superposed relation. At the beginning of the advancement of the sheets 1 and 2, the liquid-spreading rolls apply pressure to the pods 8 to rupture them. The liquid-spreading rolls are adapted to distribute the processing liquid between the superposed sheets 1 and 2 as the sheets are advanced therebetween for spreading the processing liquid in a thin and uniform layer over a predetermined area. As is well known in the art of instant photography, upon withdrawal of the film unit 10 from the camera back, the diffusion transfer process takes place outside the camera in several tens of seconds. The sheets 1 and 2 of the film unit 10 are then peeled apart from each other to provide a desired reverse image on the image-receiving sheet 2.

When the superposed sheets 1 and 2 are fully withdrawn between the liquid-spreading rolls, the leading end of a tab 7 attached to the following film unit 10 is thereby caused to project through the slot 16 outside the camera.

Figure 3:
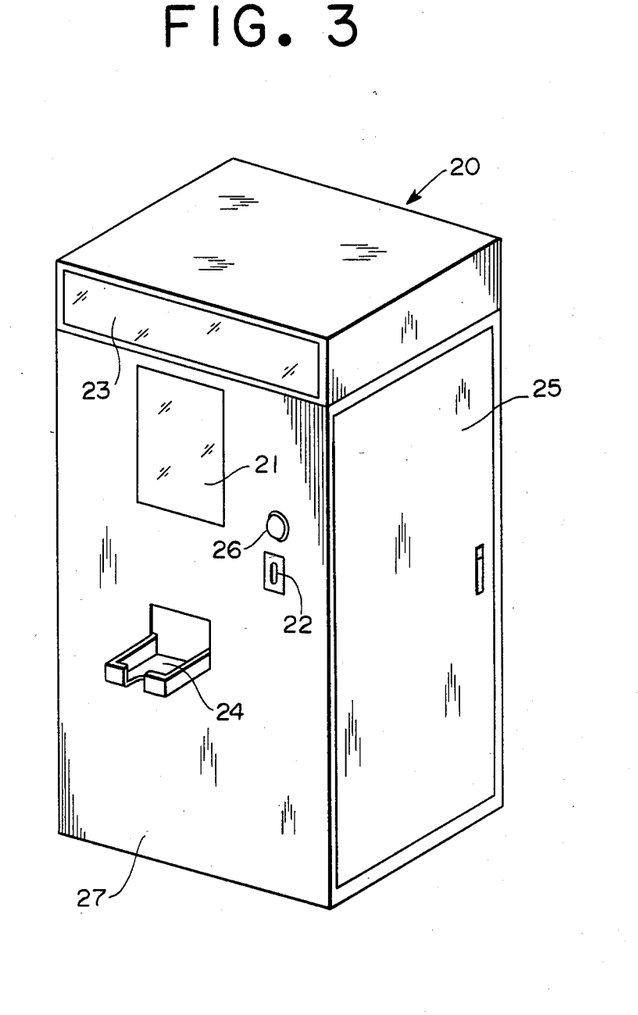
FIG. 3 is a perspective view of an automatic photo vending apparatus to which the present invention is applied.

Reference is now had to FIG. 3, which illustrates an automatic photographic apparatus 20 in accordance with the present invention which is adapted to use the film pack 11 shown in FIG. 2.

The photographic apparatus 20 in the form of an automatic photographic machine generally comprises an apparatus for taking photographs using film packs 11 described above, a film unit withdrawing apparatus and a film pack supplying apparatus, all of which are contained in a generally box-like housing comprising a rectangular forward wall 27 and a similar rear wall, joined by side and end walls. The housing includes a door 25 for access inside the housing. The forward wall 27 is provided with an exposure window with a transparent glass cover plate 21 which serves as a framing screen, an illumination window with a transparent glass cover plate 23, a coin slot 22, a ready signal lamp 26 and a film unit receptacle 24.

Referring to FIGS. 4 through 7 and 9, there is shown therein the apparatus mounted on a panel 30 secured to the inside of the housing 20.

Figure 4:
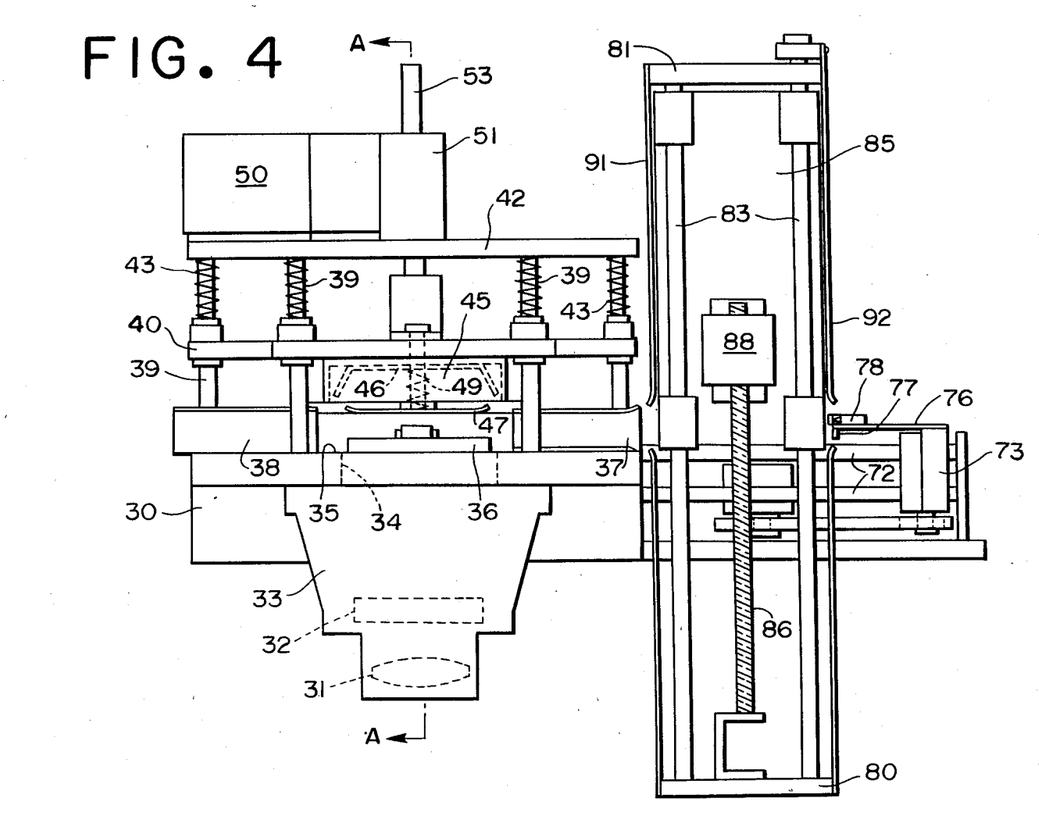
FIG. 4 is a plan view showing the photographic apparatus of an embodiment of the present invention.
Figure 5:
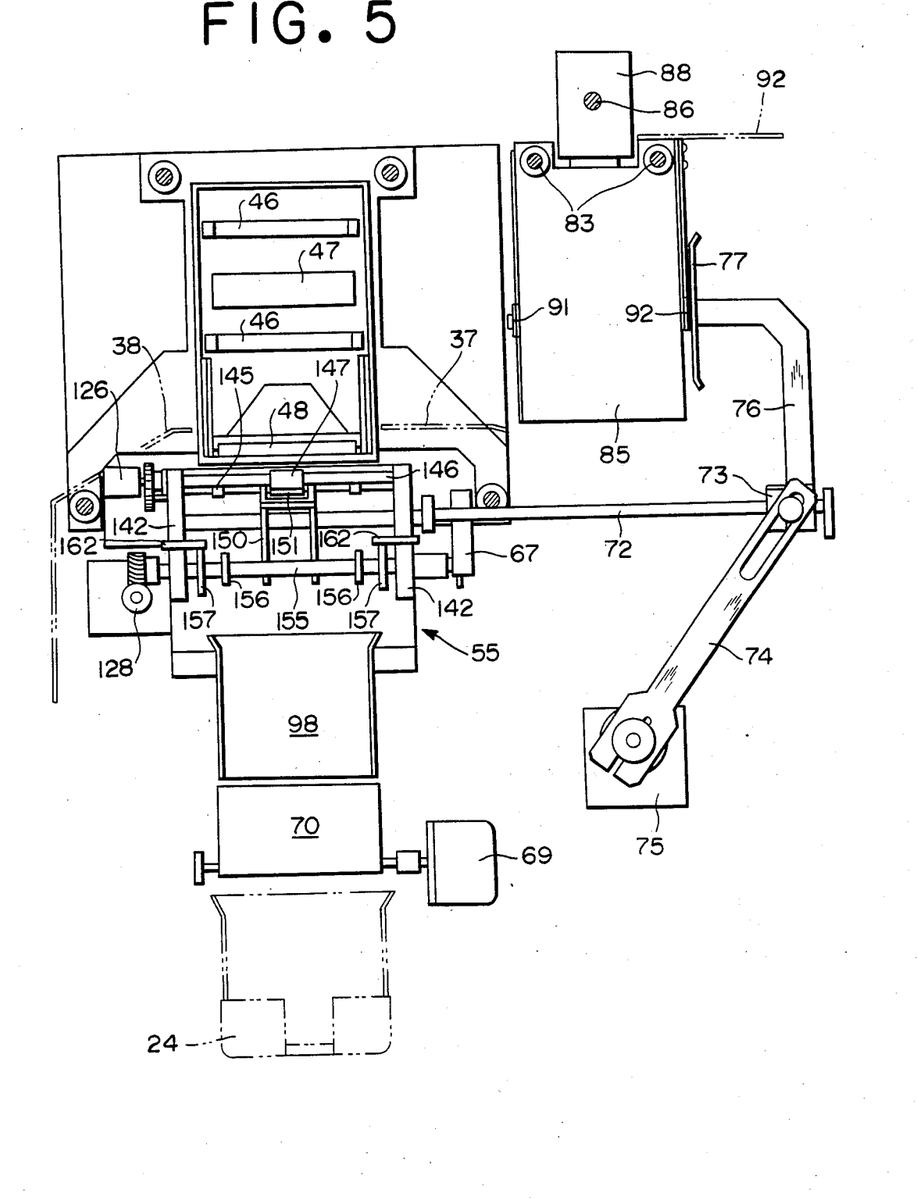
FIG. 5 is a front view showing the photographic apparatus of FIG. 4.
Figure 6:
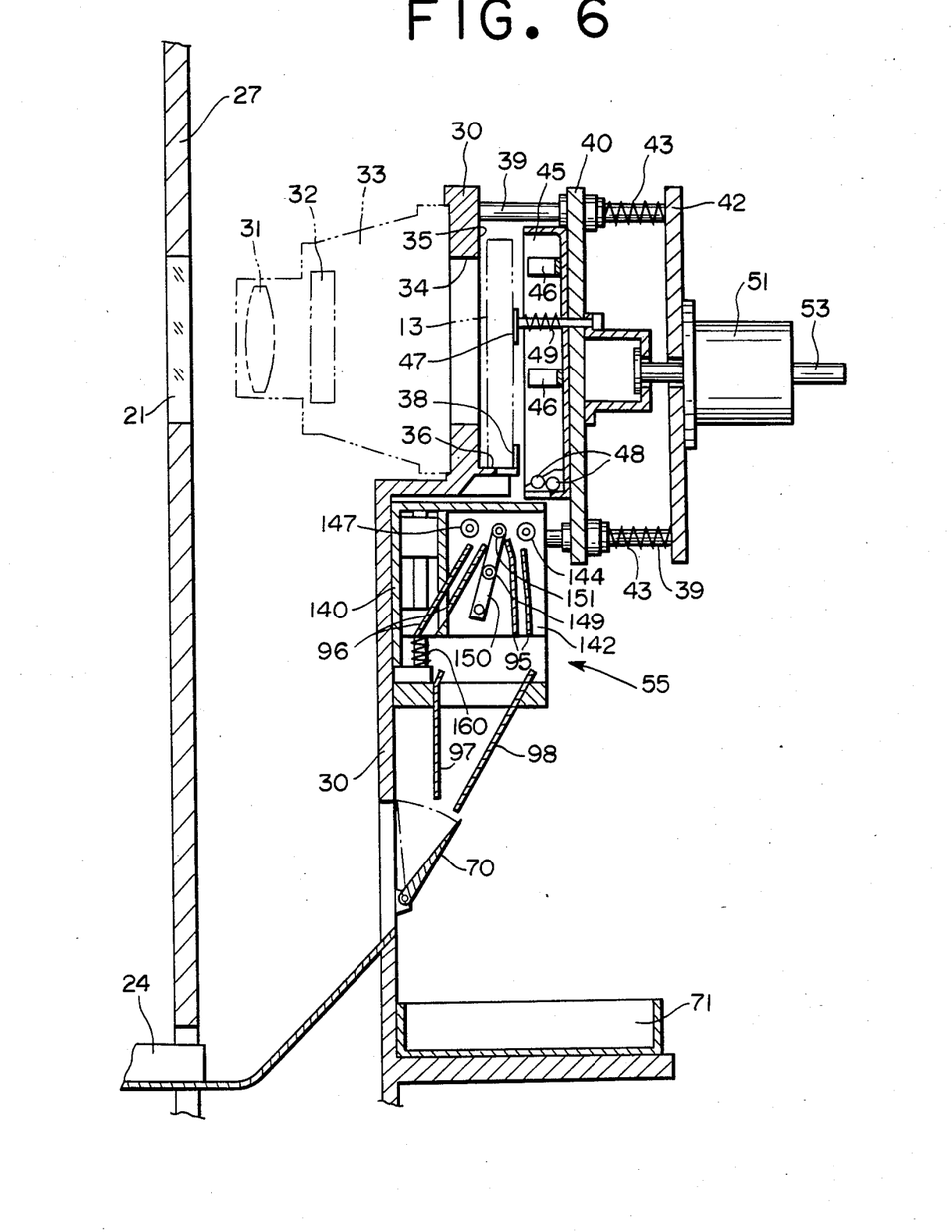
FIG. 6 is a cross sectional view taken along the line A—A in FIG. 4.

The apparatus for taking photographs includes means for exposing film units. This exposing means comprises a lens barrel 33 which has a taking lens 31 and a shutter mechanism 32 built therein. The lens barrel 33 is secured to the panel 30, which panel is provided with an exposure aperture 34 for allowing image-forming light to pass therethrough, positioned in alignment with the exposure window 21 of the forward wall 27. The rear surface 35 of the panel 30 functions as a datum plane for locating the film cassette 13 in position for exposure. For supporting the film cassette 13 in position, the panel 30 is provided with a cassette supporting member 36 and guide plates 37, 38 at the bottom of the rear surface 35.

Means are provided for urging a pressure plate 47 forwardly so as to retain the film cassette 13 against the surface 35 of the panel 30 in order that the photosensitive sheets 1 will be located in position for exposure. The urging means includes four guide rods 39 mounted on the panel 30 for slidably guiding a plate 40 supporting a camera back 45. The guide rods 39 at their rear ends hold a plate 42 fixed thereto. Between the plates 40 and 42, the guide rods 39 are provided with biasing springs 43 coiled therearound so as to press forward the camera back 45 supported on the plate 40. The camera back 45 contains a pair of spring arms 46 adapted to engage marginal portions of the film cassette 13 for restricting it in position and the pressure plate 47 for pressing the film cassette 13 against the rear surface 35 of the panel 30.

The urging means also includes a motor 50 and a head 51 having a linearly movable rod 53 both of which are secured to the plate 42. The head 51 is adapted to move the rod 53 backward and, after a temporary suspension, forward during a one-cycle operation of the motor 50. The rod 53 at its forward end is coupled to the plate 40 so as to retract it only when the rod 53 is moved backward or drawn away. Upon moving the rod 53 forward, the plate 40 is forced by the springs 43 to move forward. On the other hand, the plate 40 is retracted by rod 53 against the action of springs 43 to its limit position shown in FIGS. 4 and 6.

The camera back 45 includes liquid-spreading means comprising a pair of pressure applying rolls 48 rotatably mounted therein. The pressure-applying rolls 48 are biased toward each other for applying compressive pressure to the photosensitive and image-receiving sheets 1 and 2 as the latter are withdrawn so as to rupture the pods 8 for releasing the processing liquid and then to distribute it between the superposed sheets 1 and 2 in a layer of uniform thickness as previously mentioned.

Figure 7:
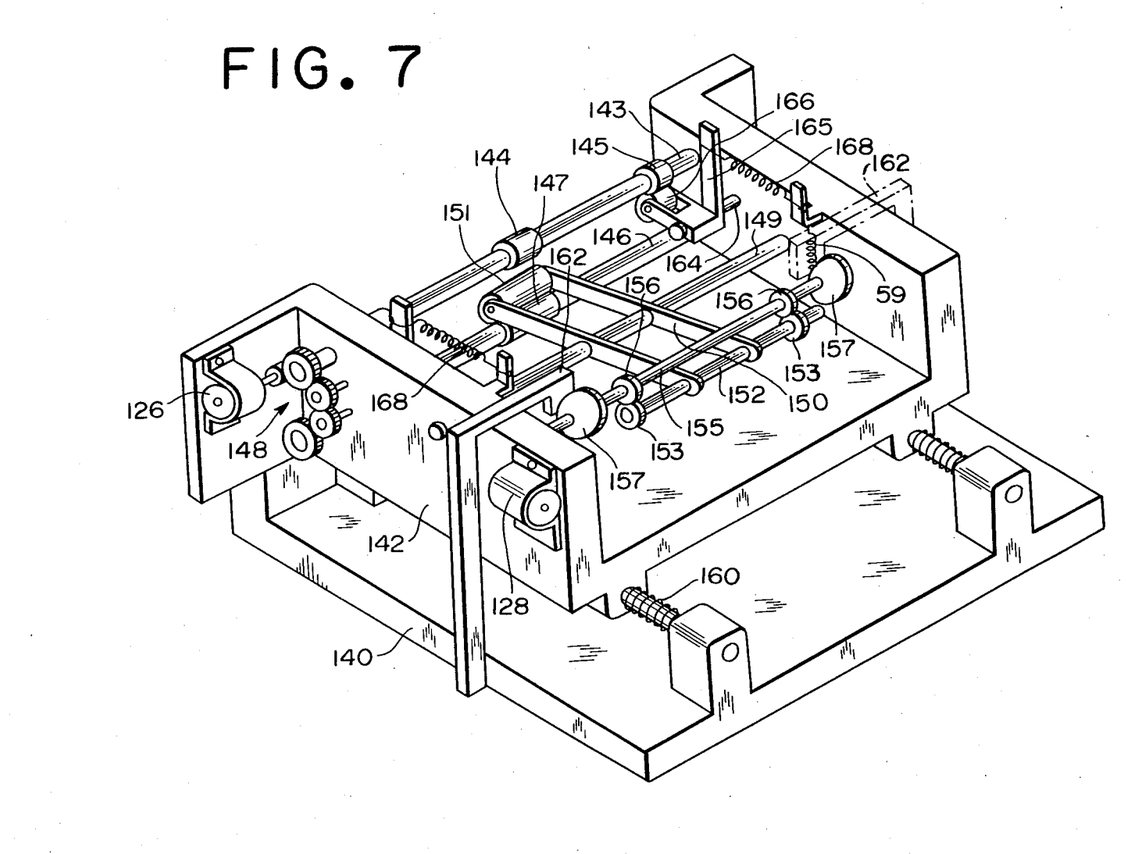
FIG. 7 is a perspective view of a film unit withdrawing apparatus.

As means for automatically withdrawing the film unit 10, there is provided an apparatus shown in FIGS. 6 and 7 which includes a base 140 and a moving frame 142 which is arranged to be slidable with respect to the base 140. A shaft 143 is rotatably supported by the moving frame 142. At the central portion of the shaft 143, a central driving roll 144 is secured, and on both sides of roll 144, side rolls 145 are secured. Furthermore, on a shaft 146 rotatably supported by the moving frame 142, a driving roll 147 is secured. The shafts 143 and 146 are rotated by a motor 126 through a gear train 148, the shaft 143 being rotated in the counterclockwise direction and the shaft 146 in the clockwise direction. The reverse rotation of the shafts 143 and 146 is prevented by a one-way clutch (not shown) provided in the gear train 148. On a shaft 149 secured to the moving frame 142, a swinging lever 150 is pivoted. At one end of the swinging lever 150, a driven roll 151 is rotatably mounted, while at the other end thereof, a pair of cam followers 153 are rotatably supported on a shaft 152.

The moving frame 142 is further provided with a rotatable shaft 155 which is rotated by a motor 128. On the shaft 155, there are provided a pair of control cams 156 adapted to control the swinging motion of the swinging lever 50 through the pair of cam followers 153, another pair of cams 157 being adapted to move the moving frame 142 up and down with respect to the base 140. Between the shaft 152 and the moving frame 142, a tension spring 59 urges the swinging lever 150 in the counterclockwise direction. As a consequence, the cam follower 153 is caused to bear against the cam surface of the control cam 156. Since the moving frame 142 is biased upwardly in FIG. 6 by springs 160 coiled around the guide rails between the base 140 and the moving frame 142, the cam surface of one of the cams 157 bears against one of the corresponding cam followers 162 secured to the base 140, thus determining the stopping position of the moving frame 142. An arm 165 is rotatable with respect to the moving frame 142 on a shaft 164. Owing to the biasing force of a tension spring 168 urging the arm 165 in the clockwise direction, the free roll 166 is pressed against one of the rolls 145 and thereby driven in rotation. Such free rolls 166 are provided at both sides corresponding to each of the rolls 145, respectively.

Figure 8:
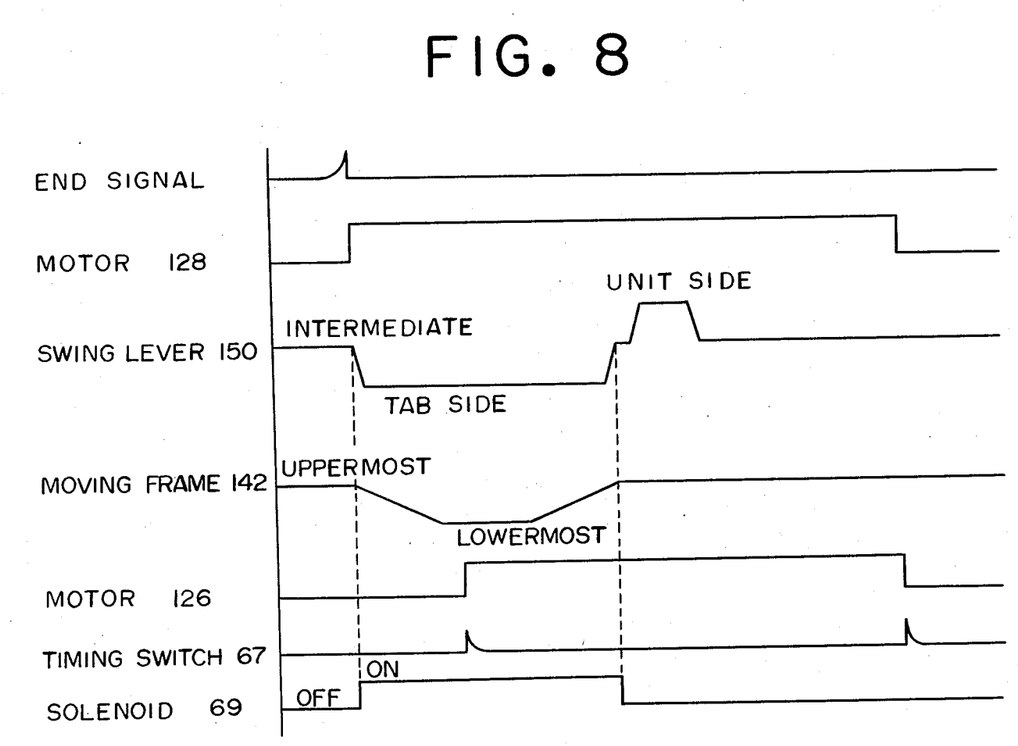
FIG. 8 is a time chart according to which the film unit withdrawing apparatus is operated.

For a description of the operation of the withdrawing apparatus 55, reference is now had to a timing chart shown in FIG. 8.

An end signal which is produced, for example after a photograph has been taken, serves as a trigger for actuating the motor 128 so as to rotate the control cams 156 and 157. As a result of this rotation, the swinging lever 150 is caused to swing in the counterclockwise direction in FIG. 6 so as to bring the central roll 151 into contact with the driving roll 147. At this time, the tab 7 extending outside the container 13 (shown in FIG. 1) is grasped between the rolls 147 and 151, while since the control cams 157 are also rotated through a certain angle, the cam surfaces of the control cams 157 depress the corresponding cam followers 162 and move the moving frame 142 downward against the action of the springs 160. During this downward movement of the moving frame 142, the rolls 147 and 151 pull the tab 7 while keeping it grasped between them. As a consequence, the leading end 6 of the carrier sheet 3 is projected from the container 13 through its elongated slot 16 as the tab 7 is pulled. At the lowermost position of the moving frame 142, the tab 7 is peeled apart from the carrier sheet 3, while a timing switch, which cooperates with one of the control cam 157 through the shaft 155, produces a signal which serves as a trigger signal for the motor 126. As a result, the driving roll 147 is caused to rotate so as to impel the tab 7 grasped between the roll 147 and the roll 151 and to eject it from the withdrawing apparatus 55 and into a wasterbasket 71. The control cams 157 continue to rotate so as to move the moving frame 142 to the uppermost position shown in FIGS. 5 and 6.

In the meantime, according to the configurations of the respective cam profiles, the driven roller 151 is brought into contact with and urged against the central roll 144 so as to grasp tightly the tapered section 6 of the carrier sheet 3 therebetween, while the moving frame 142 is kept in the uppermost position. Since the roll 144 is kept rotating, the carrier sheet 3 is withdrawn. When the carrier sheet 3 is withdrawn to some extent, according to the cam profile of the control cam 156, the swinging lever 150 is slightly moved in the counterclockwise direction. As a result, the drive roll 151 departs from the central driving roll 144 and returns to the intermediate position. At this moment, the carrier sheet 3 of the film unit 10 is grasped between the side rolls 145 and the free rolls 166. Since the free rolls 166 are urged against the corresponding side rolls 145 by the biasing spring 168, when the side rolls 145 are rotated by the motor 126, the rolls 166 follow the rotation of the side rolls 145. As a result, the carrier sheet 3 and hence the superposed photosensitive and image-receiving sheets 1 and 2 are withdrawn and delivered to the film unit receptacle 24. In this way, by moving the driven roll 151 away from the central driving roll 144, it is made impossible to apply uneven pressure to the image area of the film unit which is in the process of developing and fixing. It should be noted that the cam profile of the control cam 157 is formed such that the moving frame 142 is kept in its uppermost position as shown in FIGS. 5, 6 and 7, until the film unit has been withdrawn as described above.

In this way, when the operation of withdrawing the film unit is completed, the timing switch 67 (shown in FIG. 5) produces a pulse signal which serves as an end signal for stopping the motors 126 and 128 and the initial position is thus recovered. This means that preparation for next photograph has been completed.

As is apparent from the foregoing description, during one cycle from the start of the operation of withdrawing the tab to the completion of the withdrawing of the film unit, the control cams 156 and 157 are caused to rotate fully once. Since the withdrawn tab 7 exits by passing under the swing lever 150 and the film unit 10 over it, they can be separately recovered by providing respective auxiliary passages 96 and 95 and a deflecting blade 70 which is swung by a solenoid 69 as shown in FIGS. 5 and 6.

The photographic apparatus 20 also includes means for supplying film packs 11. The supplying means includes a pair of guide rails 72 mounted on the panel 30. Slidably mounted on the guide rails 72 is a sliding member 73 which is reciprocated by a crank lever 74 driven by a motor 75 as shown in FIGS. 4 and 5. On the top of the sliding member 73, there is provided an L-shaped lever 76 having a pushing plate 77 at its end and a microswitch 78. End plates 80 and 81 which are mounted on either the panel 30 or a stationary structural member are provided in order to support a rack 85 which will be described later with reference to FIG. 9 for accommodating a plurality of film packs 11 therein. Between the end plates 80 and 81, a pair of guide rails 83 are provided for slidably mounting the rack 85. For moving the rack 85 forward, there is provided means comprising a screw rod 86 secured to the end plate 80 at its one end, and a motor 88 stationarily mounted on the top wall of the rack 85.

Figure 9:
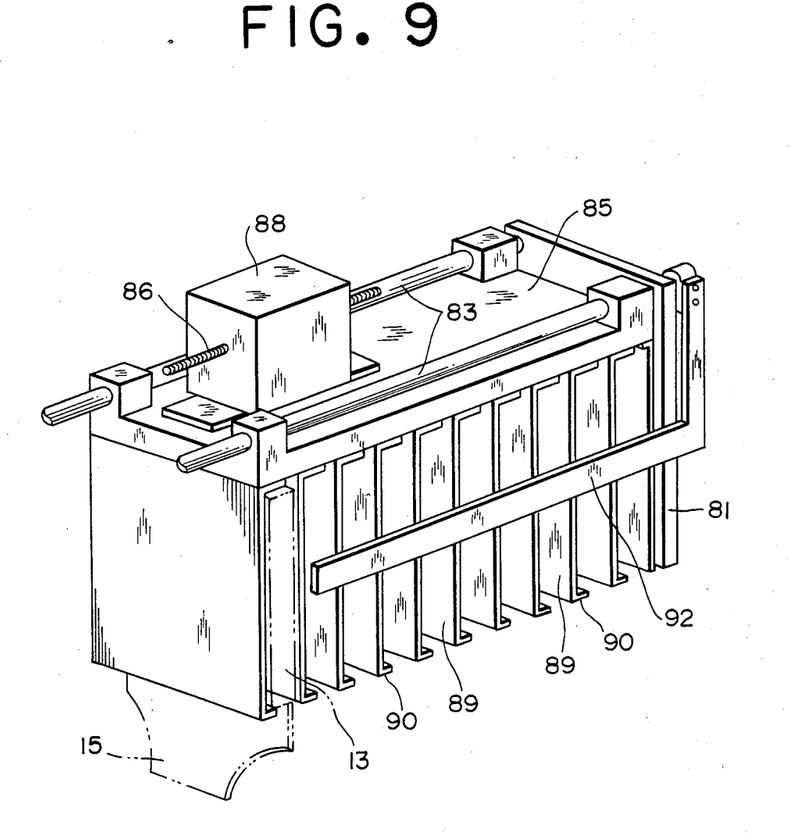
FIG. 9 is a perspective view of a rack in which a plurality of film packs are accommodated.

As shown in FIG. 9, the rack 85 has a plurality of partitions 89 by which spaces are formed for the accommodation of film packs 11. Each partition is formed with a bent portion 90 at its lower end for the purpose of supporting the end wall of the container 13. The bent portion 90 projects only to the extent that the elongated slot 16 formed in the end wall of the container is not blocked thereby. As is apparent from FIG. 9, although both sides of the rack 85 are open, there are provided guard rails 91 and 92 so as to prevent the film packs 11 from falling out side-wise. One of the guard rails, for example the guard rail 92, is swingably mounted on the end of the guide rail 83 in order to allow the loading of film packs in the rack 85. The displaced guard rail 92 is indicated by the double dotted line in FIG. 5.

Figure 10:
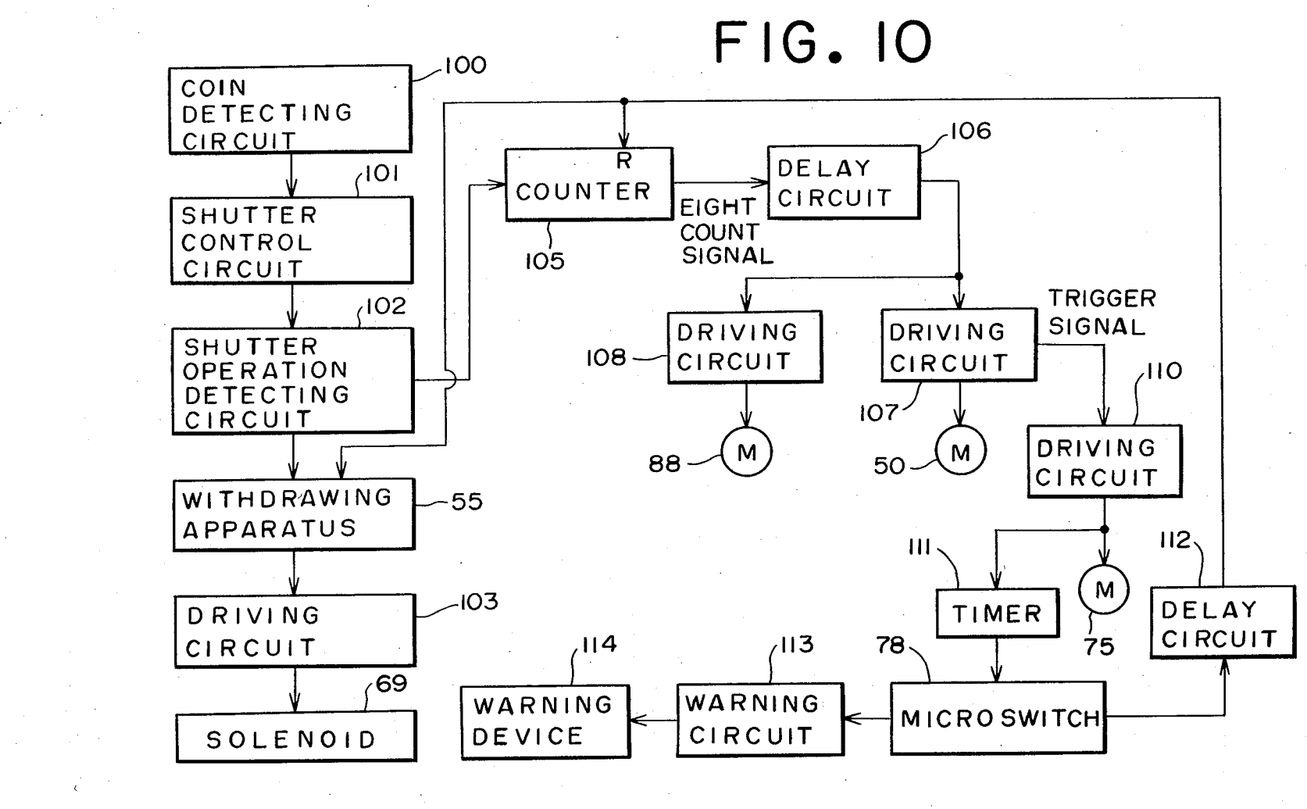
FIG. 10 is a diagram showing a control circuit for the photographic apparatus.

Referring to FIG. 10, shown therein by block diagram is the control means by which the photographic apparatus 20 is controlled to operate.

The control means includes a coin detecting circuit 100 which is adapted to detect the insertion of coins into the apparatus 20 through the coin slot 22 and to produce a signal which in turn is applied as a trigger signal to a shutter control circuit 101. The shutter control circuit 101, upon receiving the trigger signal, actuates the shutter mechanism 32 in order to make an exposure after being delayed for a certain time. A circuit 102 is provided for detecting the completed operation of the shutter mechanism 32 in order to provide a trigger signal which serves to actuate the withdrawing apparatus 55 as well as a pulse signal which in turn is input to a counter 105. A driving circuit 103 responds to the commencement of operation of the withdrawing apparatus 55 to energize the solenoid 69 so as to swing the sorting blade 70 to the position shown by the dotted line in FIG. 6 for the purpose of directing the tab peeled from the carrier sheet 3 toward the wastebasket 71. The counter 105 is adapted to receive one pulse signal every exposure and to count these pulse signals. Upon counting ten pulse signals, the counter 105 produces a ten-count signal which actuates driving circuits 107 and 108 for the motors 50 and 88, respectively, after being delayed for a certain time through a delay circuit 106. The driving circuit 107 controls the motor 50 to execute its one-cycle operation in which the camera back 45 is retracted and then advanced again after being kept retracted for a certain time. The driving circuit 108 controls the motor 88 so as to move the rack 85 a distance equal to the thickness of a cassette 13, specifically the distance between two partitions 89. During the one-cycle operation of the motor 50, specifically, during the time the camera back 45 is kept retracted, the driving circuit 107 produces a trigger signal which in turn is applied to a driving circuit 110 for the motor 75 and actuates it. As a result, the motor 75 executes its one-cycle operation thereby causing the reciprocating movement of the L-shaped lever. At the time of actuation of the driving circuit 110, a timer 111 is actuated to operate for a predetermined time. During the operation of the timer 111, the microswitch 78, when turned on, produces a signal which is applied to the withdrawing apparatus 55 for its operation as well as to the counter 105 for resetting it to its initial value, i.e., to zero. The application of the signal takes place after being delayed for a certain time by a delay circuit 112. However, when the microswitch 78 is not turned on and produces no signal, that is to say there is no film pack to be pushed by the push plate 77 in the rack 85, the microswitch produces no signal, thereby actuating a warning circuit 113 so as to energize a warning device 114 such as a lamp, a buzzer of the like.

Figure 11:
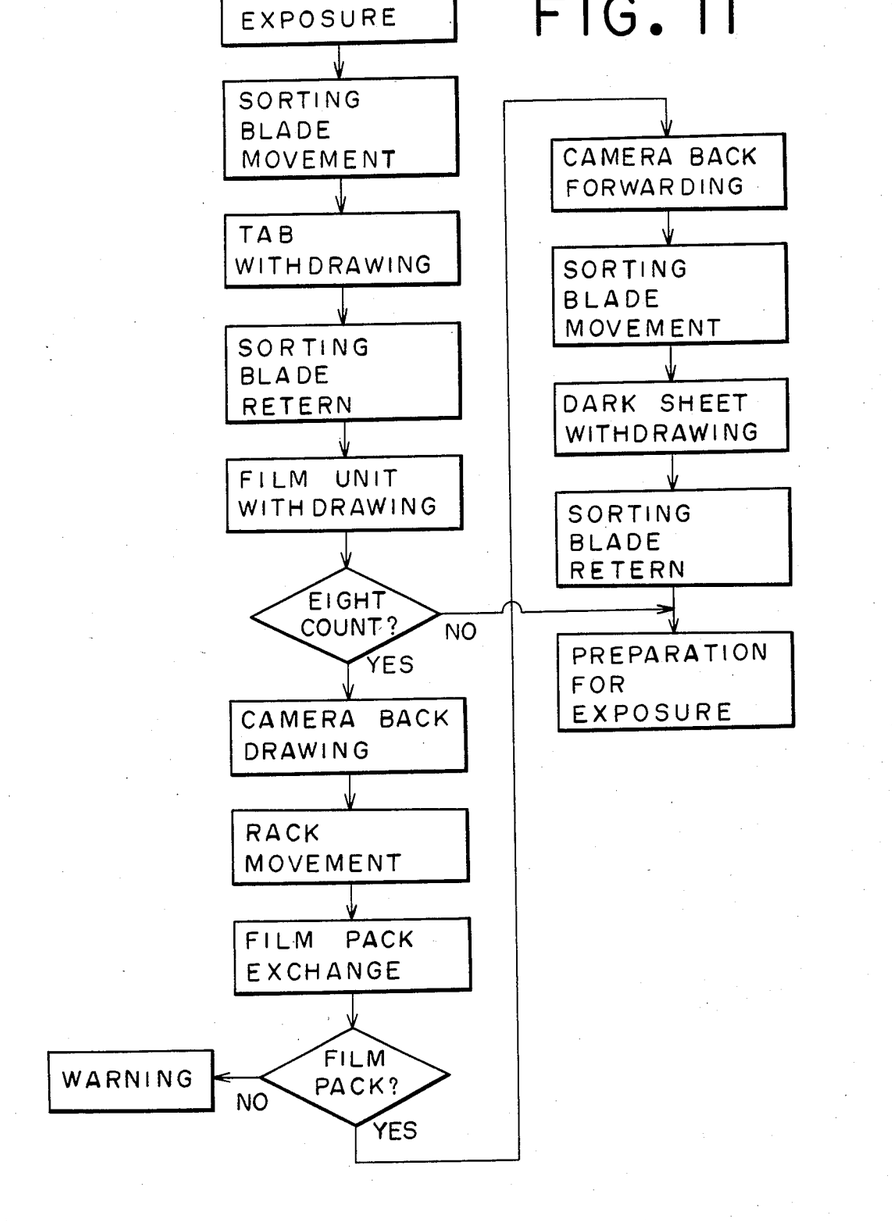
FIG. 11 is a diagram showing a flow chart according to which the photographic apparatus is operated.

The sequential operation of the photographic apparatus 20 according to the present invention will now be described with reference to FIG. 11.

When the coin detecting circuit 100 detects that coins have been inserted into the photographic apparatus 20 through the coin slot 22, the shutter mechanism 32 is actuated through the shutter control circuit 101 after being delayed for a certain time for exposing a first sheet of the photosensitive sheets 1 in the exposure aperture 12. After exposure, the trigger signal is applied to the withdrawing apparatus 55, followed by the energization of the solenoid 69 through the driving circuit 103. As a result, moving frame 142 is moved downwardly whilst the tab 7 is grasped between the driving roll 147 and driven roll 151 so as to withdraw and peel the tab 7 from the carrier sheet 3. Since the sorting blade 70 has been moved to the position shown by the dotted line in FIG. 6, the peeled tab 7 falls into the wastebasket 71. During the further downward movement of the moving frame 142, the sorting blade 70 returns to the initial position shown by the solid line in FIG. 6. As is apparent from the foregoing description, the moving frame 142 withdraws the film unit from the cassette 13, while the liquid spreading rolls 48 spread the processing liquid between the superposed sheets 1 and 2 as the sheets are advanced therebetween. The film unit 10 thus withdrawn is delivered to the film unit receptacle 24 for retrieval by the customer.

The above-mentioned operation is repeated nine times. However, when the tenth exposure is made, as determined by the counter 105, the driving circuits 107 and 108 are actuated after being delayed for a certain time sufficient to withdraw the tenth film unit 10, by the delay circuit 106. As a consequence, the motor 50 is driven so that the plate 42 supporting the camera back 45 is drawn back whilst leaving the cassette 13 on the supporting member 36. Simultaneously, the motor 88 is driven so as to move the rack 85 forward in order to locate the forwardmost fresh cassette 13 in alignment with the guide plate 37.

Whilst the motor 50 keeps the plate 40 and hence the camera back 45 retracted, the driving circuit 107 actuates the driving circuit 110 for driving the motor 75 in order to reciprocate the L-shaped lever 76. As a result of this reciprocating movement, a fresh cassette is located on the supporting member 36, whilst the used cassette on the supporting member 36 is pushed to the guide plate 38 and then discharged into the wastebasket 71. After the film cassette changing operation, the motor 50 is redriven so as to move the camera forward again, thereby stressing the leaf springs 46 and pressing the pressure plate 47 against the fresh cassette 13 thereby locating it in the exposure position.

In the meantime, when the film cassette changing operation is effected, the microswitch 78 is brought into contact with the side wall of the cassette in the rack 85 to produce a signal which is applied to the counter 105 as well as to the withdrawing apparatus 55 after being delayed by the delay circuit 112 for a certain time sufficient to locate the fresh cassette 13 in the exposure position. As a result, the counter 105 is reset and the withdrawing apparatus 55 is actuated so as to withdraw a protective dark sheet 15 of the fresh film pack 11 in preparation for another exposure.

On the other hand, since the microswitch 78 produces no signal when the rack 85 contains no film pack 11 at all, the warning means 114 gives a warning which indicates the need to fill the rack 85 with fresh film packs 11.

In the photographic apparatus described above, cams and/or link mechanisms may be provided between the motors 50, 75 and 88 and their cooperating members for moving the cooperating members in desired directions. For sequentially driving the motors 50, 75 and 88, not only may the driving circuits for the motors be controlled by a microcomputer, but also there may be provided microswitches actuated by the members cooperating with the respective motors. Furthermore, the coin detectng circuit may be replaced by a general shutter releasing mechanism, which makes it possible to apply this invention to any type of photographic apparatus for use with peel-apart type self-developing film units.

What is claimed is:

1. A photographic apparatus for use with a film pack having a cassette and a plurality of peel-apart type self-developing film units contained in the cassette in a stack, comprising means defining an exposure aperture, means for supporting a said film pack in alignment with said exposure aperture, means for exposing a said self-developing film unit; and means for processing said exposed self-developing film unit; each of said self-developing film units comprising a photosensitive sheet, an image-receiving sheet, a carrier sheet serving as a leader for connecting and registering said photosensitive and image-receiving sheets relative to each other, and a tab detachably connected to said carrier sheet and projecting outside said cassette, said apparatus comprising:

means for accommodating a plurality of said film packs in a column therein, wherein said accommodating means comprises a rack having a plurality of partitions defining spaces for receiving said film packs therein, guide rails secured to said apparatus for slidably mounting said rack thereon, and means for moving said rack so as to align said foremost film pack with transferring means and with said film pack supporting means;

means for transferring a foremost film pack in said accommodating means to said film pack supporting means;

means for urging said film pack supported by said supporting means against said exposure aperture defining means so as to position said photosensitive sheets for exposure;

means for retracting said urging means from said film pack and for keeping said urging means retracted when said foremost film pack is being transferred to said film pack supporting means; and means for withdrawing said tab and said carrier sheet in order to withdraw said film units passing through said processing means.

2. A photographic apparatus as defined in claim 1, wherein said urging means comprises a camera back including a pressure plate retractably mounted therein and a motor having a rod coupled to said camera back, said motor being controllably driven so as to axially move said rod rearward for drawing said camera back away from said film pack and forward for overlapping said film pack in order to urge said pressure plate against said film pack after having kept said camera back retracted for a time sufficient to change film packs.

3. A photographic apparatus as defined in claim 1, wherein said moving means comprises a motor mounted on said rack and a screw rod secured to said apparatus, said screw rod guiding said motor so as to move the latter forward when said motor is driven.

4. A photographic apparatus as defined in claim 3, wherein said transferring means comprises a lever adapted to laterally push said foremost film pack out of said rack and thereby locate it in said supporting means.

5. A photographic apparatus as defined in claim 4, wherein said transferring means further comprises a further motor which is driven so as to laterally reciprocate said lever and guide rails secured to said apparatus.

6. A photographic apparatus as defined in claim 5, further comprising a counter adapted to receive signals from said exposure means one every exposure, and first and second driving circuits, both of said first and second driving circuits being actuated by said counter to controllably drive said motors respectively when said counter counts the number of signals corresponding to the number of said film units initially contained in said film pack.

7. A photographic apparatus as defined in claim 6, further comprising a third driving circuit for controllably driving said further motor.

8. A photographic apparatus as defined in claim 6, further comprising a delay circuit which is provided between said counter and said first and second driving circuits.

9. A photographic apparatus as defined in claim 7, wherein said first driving circuit is adapted to produce a signal when the first-mentioned motor is not actuated so as to keep said camera back retracted, said signal actuating said third driving circuit to drive said further motor.

10. A photographic apparatus as defined in claim 8, wherein said first driving circuit is adapted to produce a signal when the first-mentioned motor is not actuated so as to keep said camera back retracted, said signal actuating said third driving circuit to drive said second motor.

11. A photographic apparatus as defined in claim 10, wherein said transferring means includes a switching means which is adapted to produce a signal when said lever pushes said foremost film pack, said signal being applied to said counter for resetting the latter.

12. A photographic apparatus as defined in claim 11, wherein said processing means is incorporated in said camera back.

13. A photographic apparatus as defined in claim 12, wherein said processing means is a pair of pressure applying rolls.

14. A photographic apparatus for use with a film pack having a cassette and a plurality of peel-apart type self-developing film units contained in the cassette in a stack, comprising means defining an exposure aperture, means for supporting a said film pack in alignment with said exposure aperture, means for exposing a said self-developing film unit, and means for processing said exposed self-developing film unit; each of said self-developing film units comprising a photosensitive sheet, an image-receiving sheet, a carrier sheet serving as a leader for connecting and registering said photosensitive and image-receiving sheets relative to each other, and a tab detachably connected to said carrier sheet and projecting outside said cassette, said apparatus comprising:

means for accommodating a plurality of said film packs in a column therein;

means for transferring a foremost film pack in said accommodating means to said film pack supporting means;

means for yieldably urging said film pack supported by said supporting means against said exposure aperture defining means so as to position said photosensitive sheets for exposure, said urging means comprising a camera back including a pressure plate retractably mounted therein, spring means yieldably urging said back toward said exposure aperture, and a motor coupled to said camera back, said motor being controllably driven for drawing said camera back away from said film pack against the action of said spring means and forward for overlapping said film pack in order to urge said pressure plate against said film pack after having kept said camera back retracted for a time sufficient to change film packs; and means for withdrawing said tab and said carrier sheet in order to withdraw said film units passing through said processing means.

* * * * *